United States Patent
Deery et al.

(10) Patent No.: US 10,419,225 B2
(45) Date of Patent: Sep. 17, 2019

(54) VALIDATING DOCUMENTS VIA BLOCKCHAIN

(71) Applicant: Factom, Austin, TX (US)

(72) Inventors: Brian Deery, Austin, TX (US); Paul Snow, Austin, TX (US); Mahesh Paolini-Subramanya, Austin, TX (US)

(73) Assignee: Factom, Inc., Austin, TX (US)

( * ) Notice: Subject to any disclaimer, the term of this patent is extended or adjusted under 35 U.S.C. 154(b) by 148 days.

(21) Appl. No.: 15/419,033

(22) Filed: Jan. 30, 2017

(65) Prior Publication Data

US 2018/0219685 A1   Aug. 2, 2018

(51) Int. Cl.
*H04L 9/32* (2006.01)
*H04L 29/06* (2006.01)

(52) U.S. Cl.
CPC .......... *H04L 9/3247* (2013.01); *H04L 9/3236* (2013.01); *H04L 63/123* (2013.01); *H04L 2209/38* (2013.01)

(58) Field of Classification Search
CPC combination set(s) only.
See application file for complete search history.

(56) References Cited

U.S. PATENT DOCUMENTS

| | | | |
|---|---|---|---|
| 4,309,569 A | 6/1982 | Merkel | |
| 5,499,294 A | 3/1996 | Friedman | |
| 5,862,218 A | 1/1999 | Steinberg | |
| 5,966,446 A | 10/1999 | Davis | |
| 7,272,179 B2 | 9/2007 | Siemens et al. | |
| 7,572,179 B2 | 8/2009 | Choi et al. | |
| 7,729,950 B2 | 6/2010 | Mendizabal et al. | |
| 8,245,038 B2 | 8/2012 | Golle et al. | |
| 8,266,439 B2 | 9/2012 | Haber et al. | |
| 8,442,903 B2 | 5/2013 | Zadoorian et al. | |
| 8,560,722 B2 | 10/2013 | Gates et al. | |
| 8,706,616 B1 | 4/2014 | Flynn | |
| 8,712,887 B2 | 4/2014 | DeGroeve et al. | |
| 8,867,741 B2 | 10/2014 | McCorkindale et al. | |
| 8,943,332 B2 | 1/2015 | Horne et al. | |
| 9,124,423 B2 | 9/2015 | Jennas, II et al. | |

(Continued)

FOREIGN PATENT DOCUMENTS

| DE | 10128728 | 1/2003 |
|---|---|---|
| JP | 5383297 | 1/2014 |

(Continued)

OTHER PUBLICATIONS

Watanabe, Hiroki, et al. "Blockchain contract: Securing a blockchain applied to smart contracts." *2016 IEEE International Conference on Consumer Electronics (ICCE)*. IEEE, 2016.

(Continued)

*Primary Examiner* — Khoi V Le
(74) *Attorney, Agent, or Firm* — Scott P. Zimmerman, PLLC

(57) ABSTRACT

Authentication of electronic document is based on multiple digital signatures incorporated into a blockchain. Structured data, metadata, and instructions may be hashed to generate the multiple digital signatures for distribution via the blockchain. Any peer receiving the blockchain may then verify an authenticity of an electronic document based on any one or more of the multiple digital signatures incorporated into the blockchain.

18 Claims, 20 Drawing Sheets

(56) References Cited

U.S. PATENT DOCUMENTS

| | | | |
|---|---|---|---|
| 9,396,006 | B2 | 7/2016 | Kundu et al. |
| 9,407,431 | B2 | 8/2016 | Bellare et al. |
| 9,411,524 | B2 | 8/2016 | O'Hare et al. |
| 9,411,976 | B2 | 8/2016 | Irvine |
| 9,411,982 | B1 | 8/2016 | Dippenaar et al. |
| 9,424,576 | B2 | 8/2016 | Vandervort |
| 9,436,935 | B2 | 9/2016 | Hudon |
| 9,472,069 | B2 | 10/2016 | Roskowski |
| 9,489,827 | B2 | 11/2016 | Quinn et al. |
| 9,584,493 | B1 | 2/2017 | Leavy |
| 9,722,790 | B2 | 8/2017 | Ebrahimi |
| 9,876,646 | B2 | 1/2018 | Ebrahimi |
| 9,882,918 | B1 | 1/2018 | Ford et al. |
| 2003/0018563 | A1 | 1/2003 | Kilgour et al. |
| 2004/0085445 | A1 | 5/2004 | Park |
| 2005/0206741 | A1 | 9/2005 | Raber |
| 2006/0075228 | A1 | 4/2006 | Black et al. |
| 2006/0184443 | A1 | 8/2006 | Erez et al. |
| 2007/0094272 | A1 | 4/2007 | Yeh |
| 2007/0296817 | A1 | 12/2007 | Ebrahimi et al. |
| 2008/0010466 | A1 | 1/2008 | Hopper |
| 2009/0025063 | A1 | 1/2009 | Thomas |
| 2009/0287597 | A1 | 11/2009 | Bahar |
| 2010/0049966 | A1 | 2/2010 | Kato |
| 2010/0058476 | A1 | 3/2010 | Isoda |
| 2010/0161459 | A1 | 6/2010 | Kass et al. |
| 2010/0241537 | A1 | 9/2010 | Kass et al. |
| 2013/0222587 | A1 | 8/2013 | Roskowski |
| 2014/0229738 | A1 | 8/2014 | Sato |
| 2014/0344015 | A1 | 11/2014 | Puertolas-Montasnes et al. |
| 2016/0071096 | A1 | 3/2016 | Rosca |
| 2016/0119134 | A1 | 4/2016 | Hakoda et al. |
| 2016/0148198 | A1 | 5/2016 | Kelley |
| 2016/0162897 | A1 | 6/2016 | Feeney |
| 2016/0217436 | A1* | 7/2016 | Brama .................. G06Q 20/06 |
| 2016/0253663 | A1* | 9/2016 | Clark .................... G06Q 20/02 705/75 |
| 2016/0260091 | A1 | 9/2016 | Tobias |
| 2016/0267472 | A1 | 9/2016 | Lingham et al. |
| 2016/0267558 | A1 | 9/2016 | Bonnell et al. |
| 2016/0275294 | A1 | 9/2016 | Irvine |
| 2016/0283920 | A1* | 9/2016 | Fisher .................. H04L 9/3239 |
| 2016/0292396 | A1* | 10/2016 | Akerwall ............. G06F 21/645 |
| 2016/0292672 | A1* | 10/2016 | Fay ...................... G06Q 20/363 |
| 2016/0292680 | A1* | 10/2016 | Wilson, Jr. ............ G06Q 20/02 |
| 2016/0300200 | A1 | 10/2016 | Brown et al. |
| 2016/0300234 | A1* | 10/2016 | Moss-Pultz ............ G06F 21/10 |
| 2016/0321675 | A1 | 11/2016 | McCoy et al. |
| 2016/0321751 | A1 | 11/2016 | Creighton, IV et al. |
| 2016/0328791 | A1 | 11/2016 | Parsells et al. |
| 2016/0330031 | A1 | 11/2016 | Drego et al. |
| 2016/0330244 | A1 | 11/2016 | Denton |
| 2016/0337119 | A1 | 11/2016 | Hosaka et al. |
| 2016/0342977 | A1 | 11/2016 | Lam |
| 2016/0342989 | A1* | 11/2016 | Davis .................. G06Q 20/385 |
| 2016/0344737 | A1 | 11/2016 | Anton et al. |
| 2017/0005797 | A1 | 1/2017 | Lanc et al. |
| 2017/0053249 | A1 | 2/2017 | Tunnell et al. |
| 2017/0061396 | A1 | 3/2017 | Melika et al. |
| 2017/0124534 | A1 | 5/2017 | Savolainen |
| 2017/0124535 | A1 | 5/2017 | Juels et al. |
| 2017/0177898 | A1 | 6/2017 | Dillenberger |
| 2017/0213287 | A1 | 7/2017 | Bruno |
| 2017/0243208 | A1 | 8/2017 | Kurian et al. |
| 2017/0243289 | A1 | 8/2017 | Rufo |
| 2017/0244757 | A1 | 8/2017 | Castinado et al. |
| 2017/0330279 | A1 | 11/2017 | Ponzone |
| 2017/0352031 | A1 | 12/2017 | Collin |
| 2017/0373859 | A1 | 12/2017 | Shors et al. |
| 2018/0075527 | A1 | 3/2018 | Nagla et al. |
| 2018/0091524 | A1 | 3/2018 | Setty |
| 2018/0097779 | A1 | 4/2018 | Karame et al. |
| 2018/0157700 | A1 | 6/2018 | Roberts |

FOREIGN PATENT DOCUMENTS

| | | |
|---|---|---|
| KR | 100653512 | 11/2006 |
| KR | 101747221 | 6/2017 |
| WO | WO 0049797 | 8/2000 |
| WO | WO 2007069176 | 6/2007 |
| WO | WO 2015077378 | 5/2015 |
| WO | WO 2018013898 A1 | 1/2018 |
| WO | WO 2018109010 | 6/2018 |

OTHER PUBLICATIONS

"BlockChain Technology", Berkeley Engineering.

Alsolami, Fahad, and Terrance E. Boult. "CloudStash: using secret-sharing scheme to secure data, not keys, in multi-clouds." *Information Technology: New Generations (ITNG), 2014 11th International Conference on.* IEEE, 2014.

Haarmann, et al., "DMN Decision Execution on the Ethereum Blockchain," Hasso Plattner Institute, University of Potsdam, 15 pages.

Kim et al., "A Perspective on Blockchain Smart Contracts," Schulich School of Business, York University, Toronto, Canada, 6 pages.

Unkown, "Federated Learning: Collaborative Machine Learning without Centralized Training Data" Apr. 6, 2017, 11 pages.

Casey, "BitBeat: Factom Touts Blockchain Tool for Keeping Record Keepers Honest", Wall Street Journal, Nov. 5, 2014.

Unknown, "Midex", https://promo.midex.com/Midex_EN.pdf, 25 pages.

Unknown, Xtrade White Paper, https://xtrade1-9649.kxcdn.com/wp-content/uploads/2017/09/xtrade-whitepaper.pdf Feb. 7, 2018, 37 pages.

Chakravorty, Antorweep, and Chunming Rong, "Ushare: user controlled social media based on blockchain." *Proceedings of the 11th International Conference on Ubiquitous Information Management and Communication.* ACM, 2017.

Chen, Zhixong, and Yixuan Zhu. "Personal Archive Service System using Blockchain Technology: Case Study, Promising and Challenging." *AI & Mobile Services (AIMS), 2017 IEEE International Conference on.* IEEE, 2017.

Al-Naji, Nader et al., "Basis: A Price-Stable Cryptocurrency with an Algorithmic Central Bank" www.basis.io Jun. 20, 2017, 27 pages.

\* cited by examiner

VALIDATING DOCUMENTS VIA BLOCKCHAIN

COPYRIGHT NOTIFICATION

A portion of this patent document and its attachments contain material which may be subject to copyright protection. The copyright owner has no objection to the facsimile reproduction of the patent document or its attachments, as it appears in the Patent and Trademark Office patent files or records, but the copyright owner otherwise reserves all copyrights whatsoever.

BACKGROUND

Authenticity is important in today's online environment. Electronic documents are easily distributed, especially via private and public networks (such as the Internet). Electronic documents are thus easily altered for fraudulent activities.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
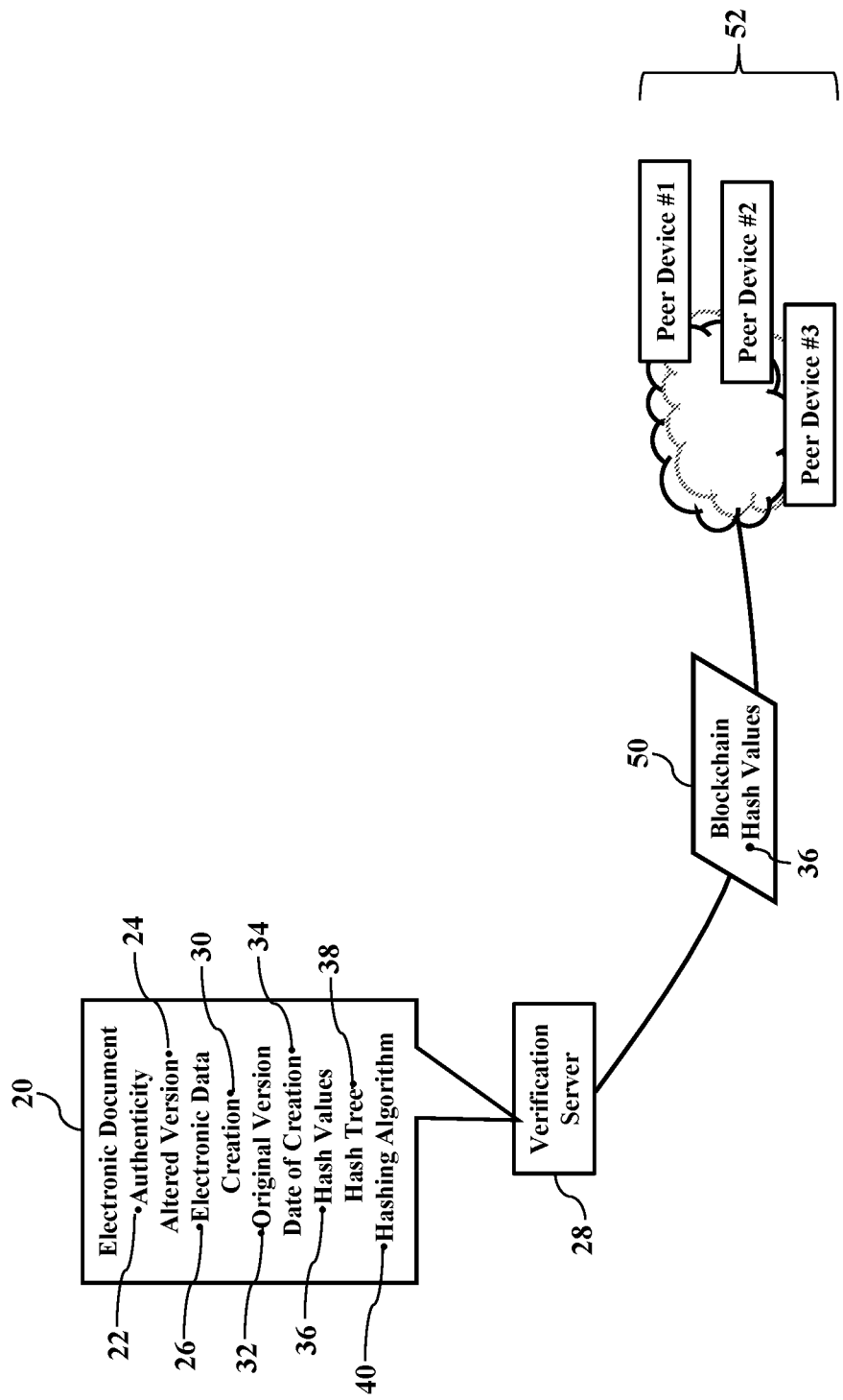
FIGS. 1-3 are simplified illustrations of validating an electronic document, according to exemplary embodiments.
Figure 2:
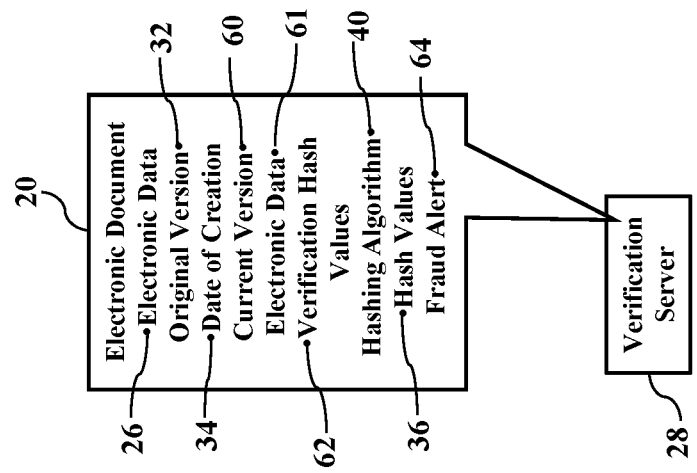
Figure 3:
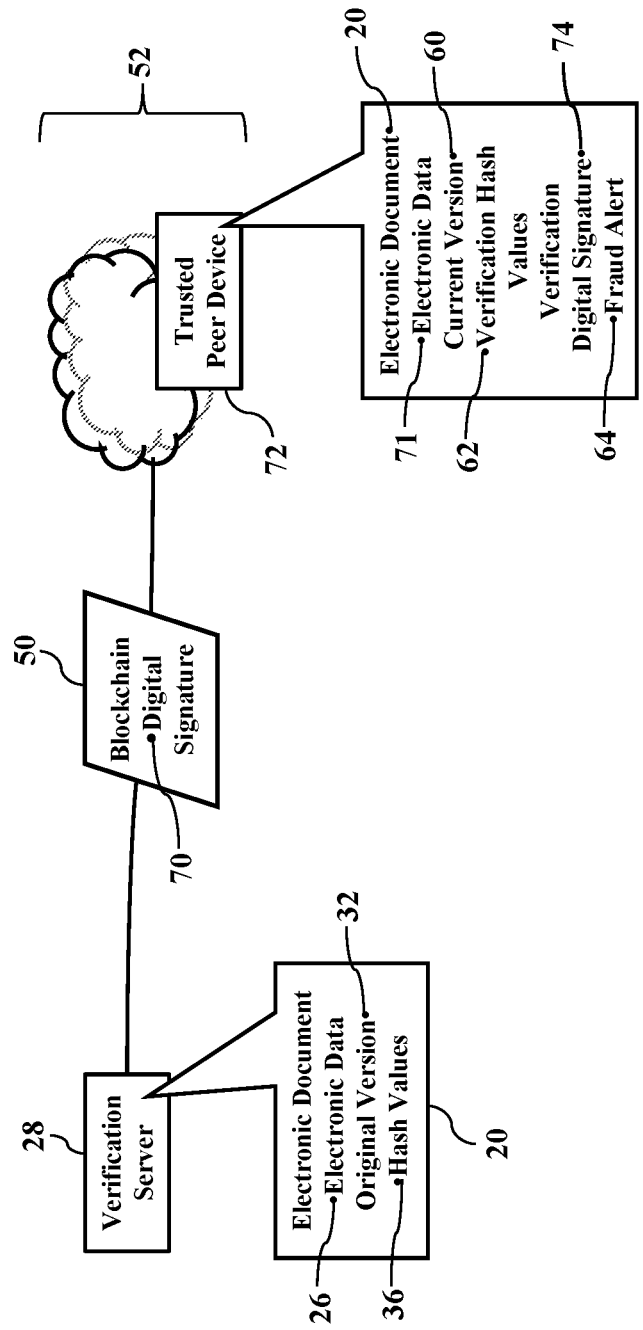

FIGS. 1-3 are simplified illustrations of validating an electronic document 20, according to exemplary embodiments. Here exemplary embodiments verify whether the electronic document 20 has been altered since creation. As the reader may understand, an authenticity 22 of the electronic document 20 may be very important in banking, security, identification, and other activities conducted via the Internet. If the electronic document 20 has changed since its original creation, then banking and other online activities may be compromised. Indeed, an altered version 24 of the electronic document 20 may indicate malicious or fraudulent activity is being attempted. Exemplary embodiments may thus include a security scheme based on electronic data 26 representing the electronic document 20.

FIG. 1 illustrates a verification server 28. The verification server 28 determines whether the electronic document 20 has been changed since creation 30. The verification server 28 obtains the electronic data 26 representing an original version 32 of the electronic document 20. This disclosure mostly explains the original version 32 as of a date 34 of creation. The original version 32, though, may be demarcated with reference to any time, date, or version. Regardless, the verification server 28 may generate one or more hash values 36 associated with a hash tree 38 based on the electronic data 26 representing the original version 32 of the electronic document 20. The hash tree 38 may be generated using an electronic representation of a hashing algorithm 40. The verification server 28 may then distribute one or more of the hash values 36 via a blockchain 50. That is, any of the hash values 36 (e.g., hash list, hash chain, branches, nodal leaves) may be added to, stored in, or incorporated in, any record, transaction, or block and distributed via the blockchain 50. While the blockchain 50 may be sent or routed to any destination (such as an Internet Protocol address associated with another server), FIG. 1 illustrates peer distribution. That is, the verification server 28 may broadcast the blockchain 50 to the IP addresses associated with a network 52 of peer devices or nodes for verification. Exemplary embodiments may thus utilize the blockchain 50 as a distribution or publication mechanism. As the reader may understand, the blockchain 50 is generally a digital ledger in which transactions are chronologically and/or publically recorded. The blockchain 50 is most commonly used in decentralized cryptocurrencies (such as Bitcoin). The blockchain 50, however, may be adapted to any chain or custody (such as in medical records and in chains of title in real estate transactions). Indeed, there are many different mechanisms and configurations of the blockchain 50, and exemplary embodiments may be adapted to any version. Because peer-to-peer blockchain technology is generally known, this disclosure need not provide a detailed explanation.

FIG. 2 illustrates a verification scheme. Here the verification server 28 determines whether a current version 60 of the electronic document 20 has changed since the date 34 of creation. That is, the verification server 28 determines whether the current version 60 differs from the original version 32. The verification server 28 retrieves electronic data 61 representing the current version 60 of the electronic document 20. The verification server 28 may then generate one or more verification hash values 62 based on the electronic data 61 representing the current version 60. The verification hash values 62 are generated using the electronic representation of the hashing algorithm 40. The verification server 28 may then compare the verification hash values 62 to the hash values 36 representing the original version 32 (as of the date 34 of creation). If the verification hash values 62 satisfactorily compare to the hash values 36, then the verification server 28 may infer or determine that the current version 60 is the same as the original version 32. If, however, the verification hash values 62 fail to satisfy the hash values 36, then the verification server 28 may infer that the current version 60 differs from the original version 32. The current version 60 of the electronic document 20, in other words, has been altered since the date 34 of creation. The verification server 28 may thus generate a fraud alert 64 to implement enhanced security measures.

Exemplary embodiments may detect minor changes. The hashing algorithm 40 is very sensitive to even subtle alterations in the electronic document 20. There are many hashing algorithms, and exemplary embodiments may utilize any of the hashing algorithms. For simplicity, though, this disclosure will mostly discuss the SHA family of cryptographic hashing algorithms, which many readers are thought familiar. For example, if the SHA-256 algorithm is applied to the electronic data 26 representing the original version 32, the result is a 256-bit digital signature. There is thus an extremely low probability that different source data would produce the same digital signature. So, if the current version 60 of the electronic document 20 has even a subtle change (such as a single character in a single textual word or number), its corresponding digital signature (e.g., the verification hash values 62) will not match or equal the hash values 36 representing the original version 32. Exemplary embodiments thus quickly determine whether the electronic document 20 has been changed since the date 34 of creation.

FIG. 3 illustrates nodal verification. Here exemplary embodiments may distribute one or more of the hash values 36 via the blockchain 50. Once the verification server 28 generates the hash values 36 (based on the electronic data 26 representing the original version 32 of the electronic document 20), the verification server 28 may distribute the hash values 36 via the blockchain 50. For example, the verification server 28 may incorporate the 256-bit digital signature 70 (generated by the SHA-256 algorithm) into the blockchain 50. Any trusted member of the network 52 of peer devices may then verify the current version 60 of the electronic document 20. A trusted peer device 72, for example, may receive the blockchain 50 and retrieve or determine the digital signature 70 incorporated therein. The trusted peer device 72 may then itself retrieve the electronic data 71 representing the current version 60 and generate the verification hash values 62 (such as a 256-bit verification digital signature 74). The trusted peer device 72 may then compare the hash values 36 (received via the blockchain 50) to the verification hash values 62 generated based on the current version 60 of the electronic document 20. As a simple example, the trusted peer device 72 may compare the 256-bit digital signature 70 (based on the original version 32) to the 256-bit verification digital signature 74 (based on the current version 60). If the verification hash values 36 (such as a 256-bit verification digital signature 74) satisfactorily compare to the hash values 36 (such as the 256-bit digital signature 70) received via the blockchain 50, then the trusted peer device 72 may infer or determine that the current version 60 is authentic and unaltered. However, if the verification hash values 36 (e.g., the 256-bit verification digital signature 74) fails to satisfy the hash values 36 (e.g., the 256-bit digital signature 70, then the trusted peer device 72 may infer that the current version 60 is inauthentic and altered. The trusted peer device 72 may thus generate the fraud alert 64 to implement enhanced security measures.

Figure 4:
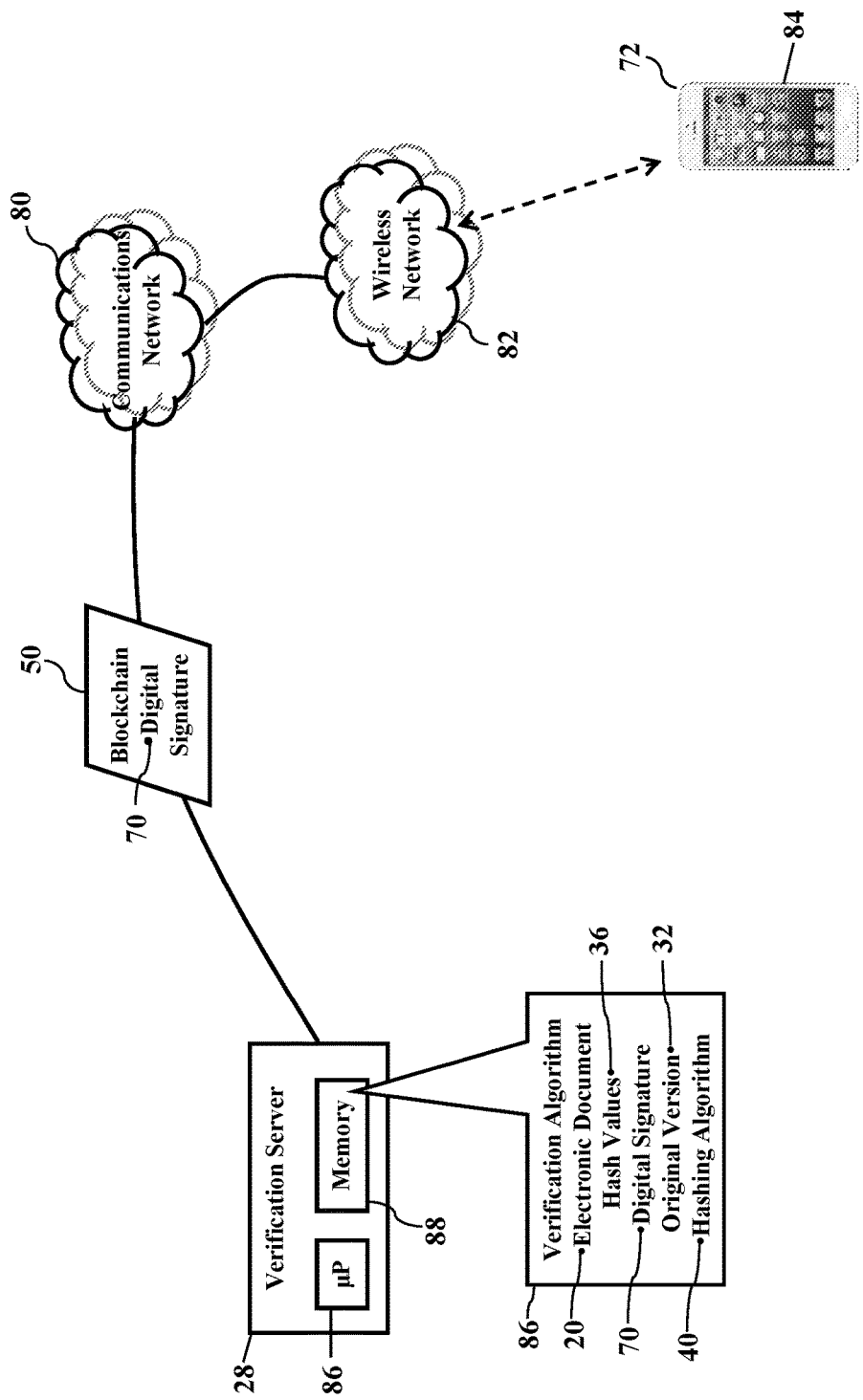
FIGS. 4-7 are detailed illustrations of an operating environment, according to exemplary embodiments.

FIGS. 4-7 are detailed illustrations of an operating environment, according to exemplary embodiments. FIG. 4 illustrates the verification server 28 communicating with the trusted peer device 72 via a communications network 80 and/or via a wireless network 82. FIG. 4 illustrates the trusted peer device 72 as a mobile smartphone 84, which most readers are thought familiar. The trusted peer device 72, though, may be any processor-controlled device, as later paragraphs will explain. The verification server 28 may have a processor 86 (e.g., "µP"), application specific integrated circuit (ASIC), or other component that executes a verification algorithm 86 stored in a local memory device 88. The verification algorithm 86 includes instructions, code, and/or programs that cause the verification server 28 to perform operations, such as generating the hash values 36 associated with the electronic document 20 (as the above paragraphs explained). The verification algorithm 86 may thus generate the digital signature 70 representing the original version 32 (using the hashing algorithm 40). The verification algorithm 86 may then instruct or cause the verification server 28 to integrate the digital signature 70 into the blockchain 50 for distribution to the mobile smartphone 84. Exemplary embodiments, though, may send the digital signature 70 and/or the blockchain 50 to any IP address associated with any network destination or device.

Figure 5:
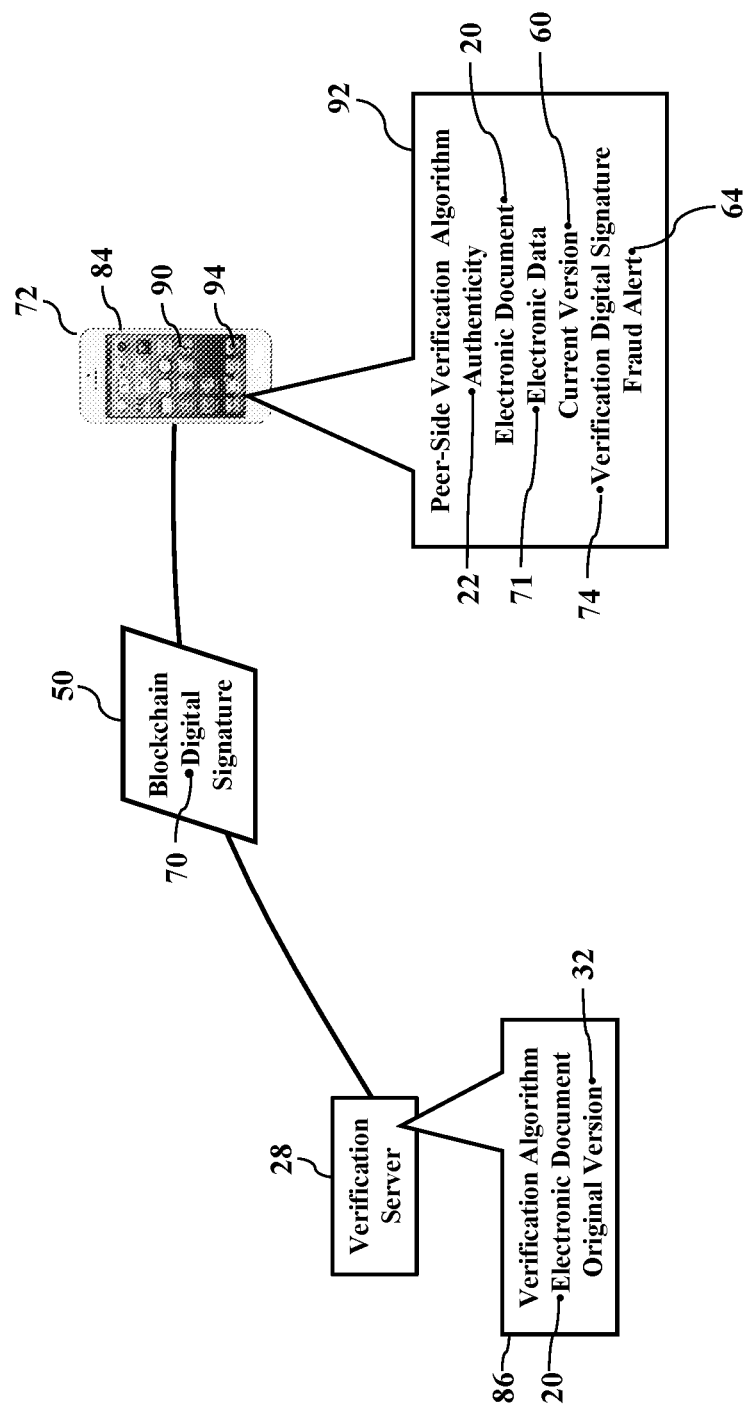

FIG. 5 illustrates peer verification. Now that the blockchain 50 is distributed, the trusted peer device 72 (again illustrated as the mobile smartphone 84) may determine the authenticity 22 of the current version 60 of the electronic document 20. FIG. 5 thus illustrates the mobile smartphone 84 receiving the blockchain 50 and the digital signature 70 integrated therein. The mobile smartphone 84 has a processor 90, application specific integrated circuit (ASIC), or other component that executes a peer-side verification algorithm 92 stored in a local memory device 94. The peer-side verification algorithm 92 includes instructions, code, and/or programs that cause the processor 90 to perform operations, such as verifying the current version 60 of the electronic document 20. The peer-side verification algorithm 92 causes the mobile smartphone 84 to retrieve the electronic data 71 representing the current version 60 and to generate the verification digital signature 74 (such as the corresponding 256-bit hash). If the verification digital signature 74 satisfactorily compare to the digital signature 70 received via the blockchain 50, then the peer-side verification algorithm 92 may infer or determine that the current version 60 is authentic and unaltered. However, if the verification digital signature 74 fails to satisfy the digital signature 70 received via the blockchain 50, then the peer-side verification algorithm 92 may infer that the current version 60 is inauthentic and altered. The peer-side verification algorithm 92 may thus generate the fraud alert 64 to implement enhanced security measures.

Figure 6:
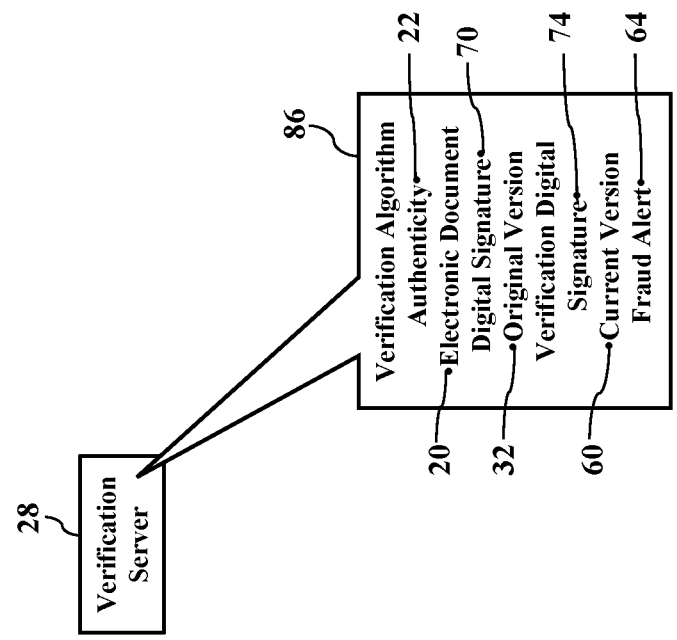

FIG. 6 illustrates servile verification. Here the verification server 28 may itself determine the authenticity 22 of different versions of the electronic document 20. Whenever the verification server 28 receives the current version 60 of the electronic document 20, the verification server 28 may alert or notify of security concerns. Here the verification algorithm 86 causes the verification server 28 to retrieve the current version 60 and to generate the corresponding verification digital signature 74. If the verification digital signature 74 satisfactorily compares to the digital signature 70 (representing the original version 32), then the verification algorithm 86 may infer or determine that the current version 60 is authentic and unaltered. However, if the verification digital signature 74 fails to satisfy the digital signature 70 (representing the original version 32), then the verification algorithm 86 may implement the fraud alert 64, as the current version 60 is inauthentic and/or altered.

Figure 7:
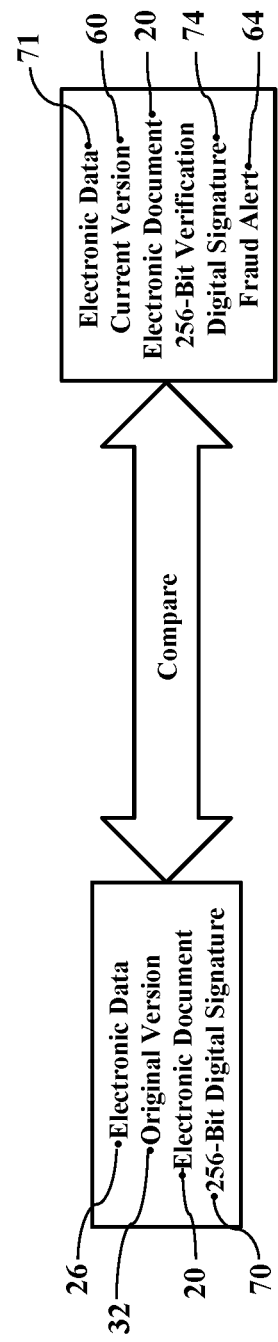
Figure 8:
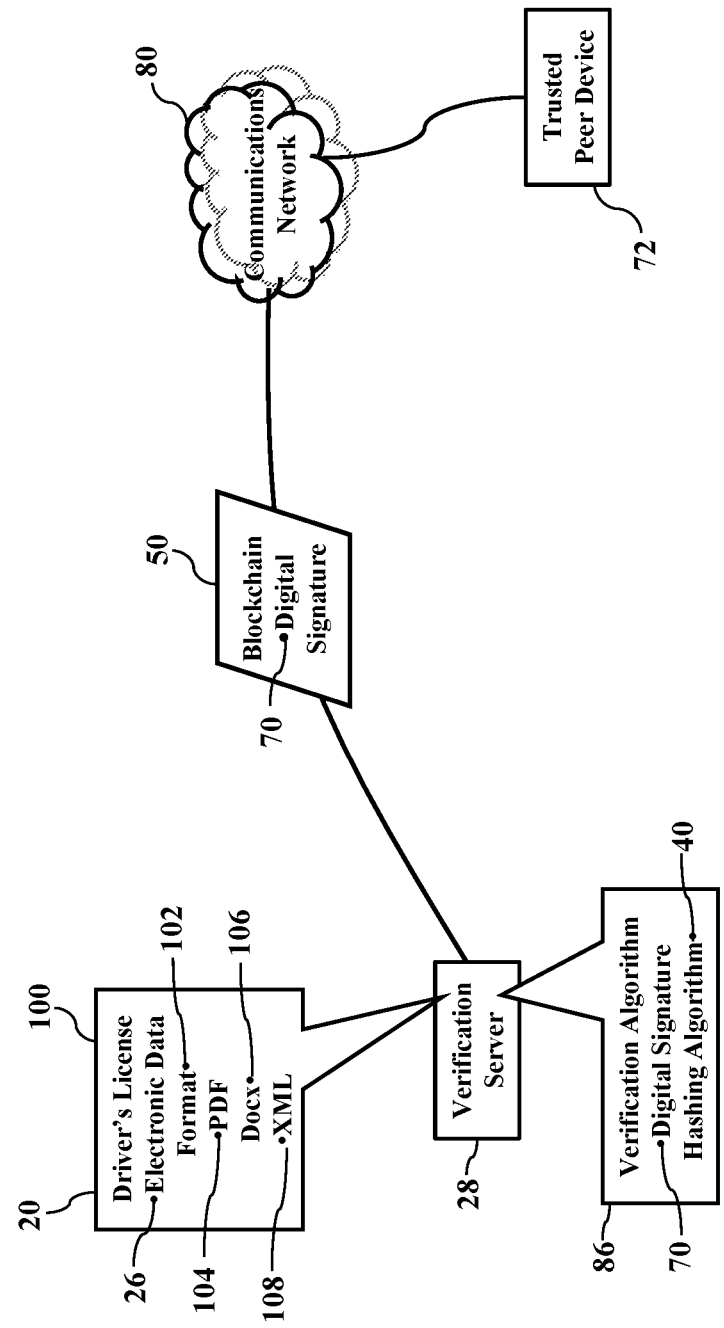
FIGS. 8-12 further illustrate verification, according to exemplary embodiments.

FIG. 7 illustrates the general verification scheme. Again, because many readers may be familiar with the SHA-256 hashing algorithm, the general verification scheme may use the 256-bit hash value computed by the SHA-256 algorithm. Exemplary embodiments obtain or retrieve the electronic data 26 representing the original version 32 of the electronic document 20. The electronic data 26 is acted on by the SHA-256 hashing algorithm to generate a 256-bit hash value as the digital signature 70. Exemplary embodiments may also obtain or retrieve the electronic data 71 representing the current version 60 of the electronic document 20. The electronic data 71 is acted on by the SHA-256 hashing algorithm to generate a corresponding 256-bit hash value as the verification digital signature 74. If a match is determined, exemplary embodiments may infer that the current version 60 is authentic and unaltered. However, if the digital signatures 70 and 74 fail to match, exemplary embodiments may infer that the current version 60 is inauthentic and generate the fraud alert 64.

Exemplary embodiments may be applied regardless of networking environment. Exemplary embodiments may be easily adapted to stationary or mobile devices having cellular, wireless fidelity (WI-FI®), near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Exemplary embodiments may packetize. The verification server 28 and the trusted peer device 72 may have network interfaces to the communications network 80, thus allowing collection and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address associated with any of the verification server 28 and the trusted peer device 72.

FIGS. 8-12 further illustrate verification, according to exemplary embodiments. Here exemplary embodiments authenticate the electronic document 20, based on its electronic data 26. While exemplary embodiments are applicable to any type of the electronic document 20, most readers are thought familiar with a driver's license 100. That is, the electronic document 20 may have content representing an electronic version of the driver's license 100. While the electronic document 20 may be formatted according to any format 102, most readers are thought familiar with a portable document format ("PDF") 104, the MICROSOFT® WORD® extensible markup language extension ("docx") 106, and/or the extensible markup language ("XML") 108. Exemplary embodiments may thus retrieve the electronic data 26 representing the driver's license 100 and generate the corresponding digital signature 70 (such as the corresponding 256-bit hash if using the SHA-256 hashing algorithm 40). Exemplary embodiments may then incorporate the digital signature 70 into the blockchain 50 for distribution via the communications network 80. Any destination (such as the trusted peer device 72) may thus verify an alleged copy of the driver's license 100 against the blockchain 50 (as this disclosure above explains).

Exemplary embodiments may be applied to any file formatting and/or specification. The format 102 may be proprietary, free, unpublished, and/or open. The format 102 may be designed for images, containers, audio, video, text, subtitles, control characters, and encoding schemes. The format 102 may be HTML, vector graphics, source code, text files, syntax, and software programming.

Figure 9:
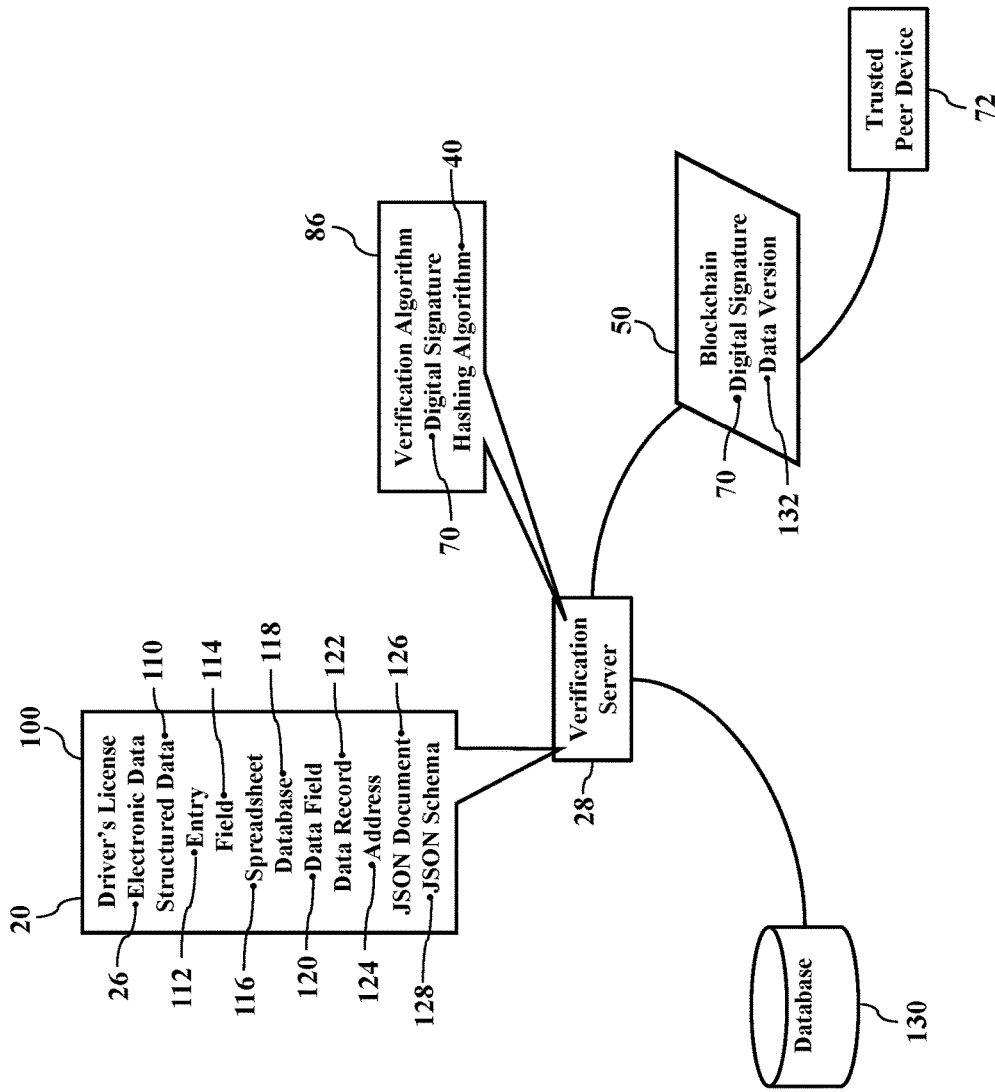

FIG. 9 illustrates structured data 110. As the reader may understand, the electronic data 26 representing the electronic document 20 may be the structured data 110. That is, the structured data 110 may be organized (such as an entry 112 or database field 114 in a relational spreadsheet 116 or database 118), contained within a fixed data field 120 or data record 122, and/or be addressable via a network or memory address 124. Again referencing the electronic version of the driver's license 100, the structured data 110 may be organized according to the JavaScript Object Notation (or "JSON"). As the JavaScript Object Notation is a known format for structuring data, the JSON format need not be explained in detail. Suffice it to say that at least some of the electronic data 26 representing the driver's license 100 may be a JSON document 126 having the structured data 110 arranged as fields [{"Name":"Bob Smith"}, {"State": "TX"}, {"Birth":"May 1, 1975"} . . . ]. The driver's license 100 may thus be formatted according to a JSON schema 128 and stored in an electronic database 130 (perhaps having other structured data 110, such as electronic database associations according to [{"Title":"Drivers License", "properties": {"Name": {"type":"string" } . . . ].

Exemplary embodiment may thus incorporate a data version 132 in the blockchain 50. For example, if the driver's license 100 is the JSON document 126, then the data version 132 may be the structured data 110 arranged or formatted according to the JSON schema 128. Exemplary embodiments may thus retrieve the data version 132 and generate the corresponding digital signature 70 (such as the 256-bit hash value using the SHA-256 hashing algorithm 40). Exemplary embodiments may then incorporate the digital signature 70 into the blockchain 50 for distribution (such as to the trusted peer device 72). The trusted peer device 72 may thus verify an alleged copy of the driver's license 100 against the blockchain 50 (as this disclosure above explains). Moreover, once the structured data 110 is known (such as JSON schema 128), any electronic document referenced in the electronic database 130 may be recreated, hashed, and checked against the blockchain 50 to ensure the electronic data 26 has not been altered. For example, if the electronic data 26 representing the driver's license 100 is stored in a human resources database, then exemplary embodiments permit recreating the driver's license 100 (perhaps via a POSGRES® database) and authentication.

Figure 10:
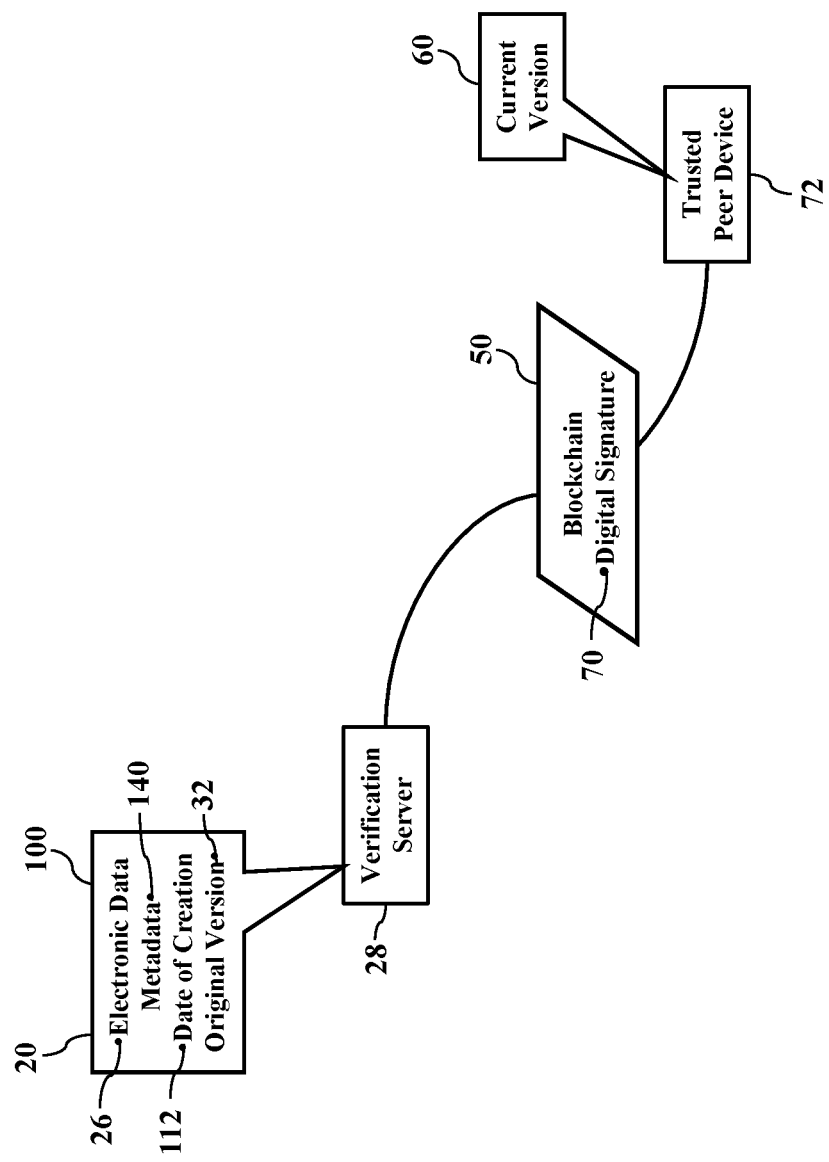
Figure 11:
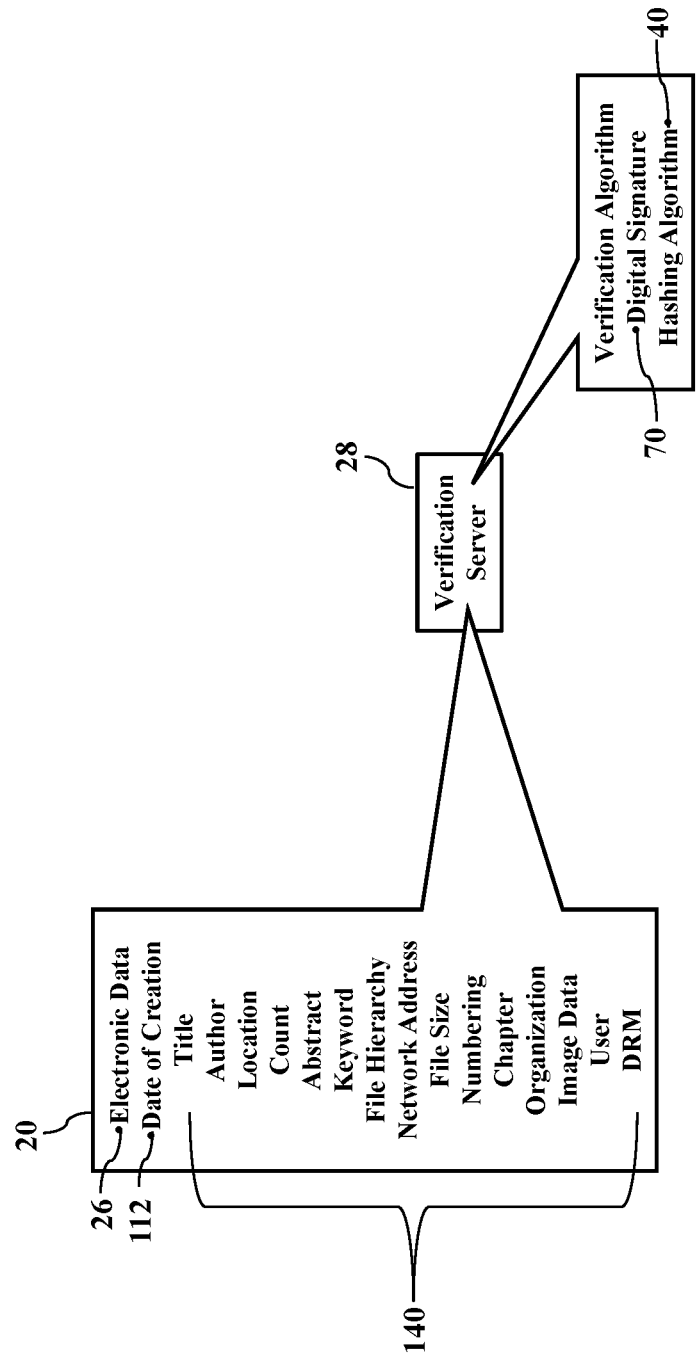

FIGS. 10-11 illustrate metadata 140. Here the electronic data 26 representing the electronic document 20 (such as the driver's license 100) may include the metadata 140 (such as [{"CreationTime":"2012-05-07T11:12:32"}, {"SourceID": "1131122"}, {"Location": "Wells Fargo System XXX, ID YYY"} . . . ]. Exemplary embodiments may thus retrieve the metadata 140 and generate the corresponding digital signature 70 (such as the 256-bit hash value representing the metadata 140). Exemplary embodiments may then incorporate the digital signature 70 representing the metadata 140 into the blockchain 50 for distribution to the trusted peer device 72. The trusted peer device 72 may thus perform a two-fold verification. That is, any alteration to the driver's license 100 may be determined (as this disclosure explains), but exemplary embodiments may also verify that the date 34 of creation (e.g., [{"CreationTime":"2012-05-07T11:12: 32"}] has not changed. Again, if the digital signature 70 representing the metadata 140 has changed over time (such as when comparing the original version 32 to the current version 60), then exemplary embodiments may flag or notify of a possible fraud attempt. Any change in the digital signature 70 over time may also be useful for audit trails in banking, mortgage processing, and other activities.

FIG. 11 illustrates different types of the metadata 140. While exemplary embodiments may hash any type of the metadata 140, this disclosure will mainly describe the metadata 140 thought familiar to most readers. For example, the metadata 140 may describe the date 112 of creation, a title, an author, a location (such as GPS information at creation), word/character count, and an abstract describing or summarizing the electronic document 20. The metadata 140 may also include one or more keywords associated with the electronic document 20. The metadata 140 may also include a file hierarchy where the electronic document 20 is stored and/or a network address for retrieval. The network address, for example, may be associated with a server or other machine locally or remotely storing the electronic document 20. The metadata 140 may also include structural details, such as file size, page numbering, chapter organization, and image data. Other metadata 140 may describe approved users (such as administrator and user permissions or identities) and digital rights management (or "DRM"). The metadata 140 may be formatted according to any standard.

Figure 12:
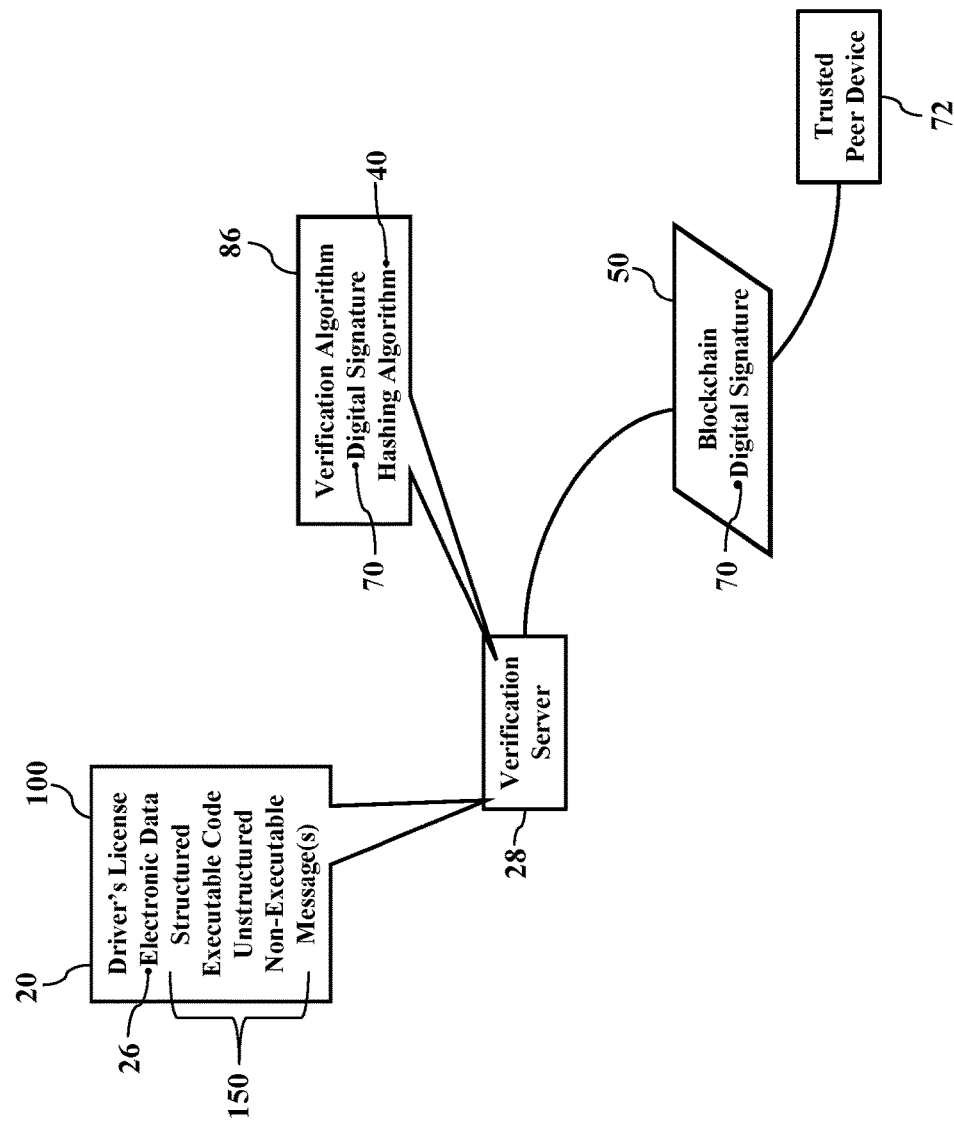

FIG. 12 illustrates instructions 150. Here the electronic data 26 representing the driver's license 100 may include the instructions 150. While exemplary embodiments may be applicable to any instructions, the instructions 150 may be structured (such as executable code), unstructured instructions (such as non-executable commentary lines in code, such as English language "do thing 1, then thing 2, then thing 3"). Other instructions 150 may include any messages (such as "When this document is accessed, POST to the URL http://some.target.url"). Exemplary embodiments may thus retrieve the instructions 150, generate the corresponding digital signature 70 (such as the 256-bit hash value representing the instructions 150), and incorporate into the blockchain 50. Again, if the digital signature 70 representing the instructions 150 has changed over time, then exemplary embodiments may flag or notify of a possible fraud attempt.

Figure 13:
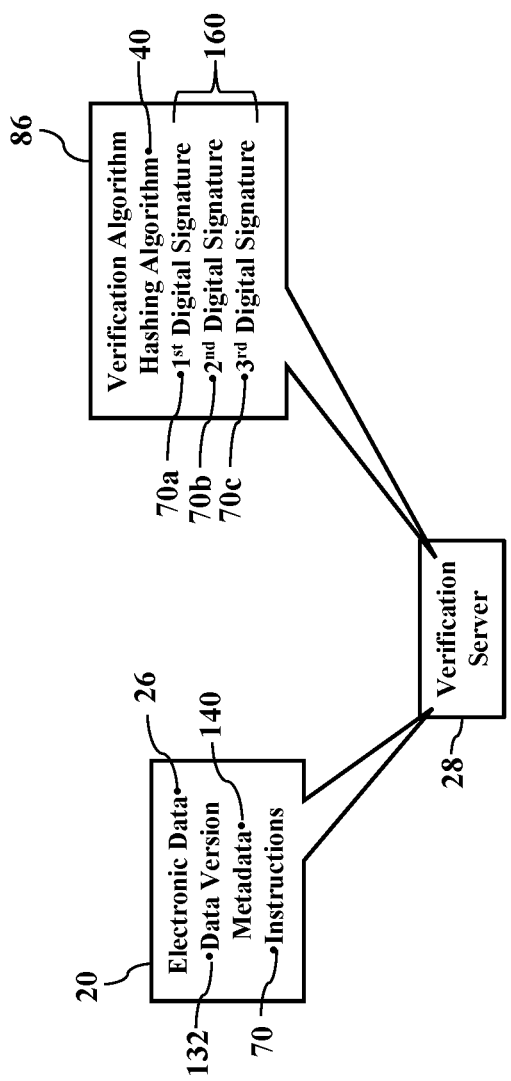
FIG. 13 illustrates multiple digital signatures, according to exemplary embodiments.

FIG. 13 illustrates multiple digital signatures 160, according to exemplary embodiments. Because the electronic document 20 may comprise or contain multiple types of the electronic data 26, exemplary embodiments may generate the multiple digital signatures 160. Exemplary embodiments, for example, may generate a first digital signature 70a (such as the 256-bit hash value using the SHA-256 hashing algorithm 40) based on the data version 132 associated with the electronic document 20 (as above explained with reference to FIGS. 8-9). Exemplary embodiments may generate a second digital signature 70b based on the metadata 140 contained within, or associated with, the electronic document 20 (as above explained with reference to FIGS. 10-11). Exemplary embodiments may generate a third digital signature 70c based on the instructions 150 contained within, or associated with, the electronic document 20 (as above explained with reference to FIG. 12). Any or all of the multiple digital signatures 160 may be generated based on the electronic data 26 representing the electronic document 20.

Figure 14:
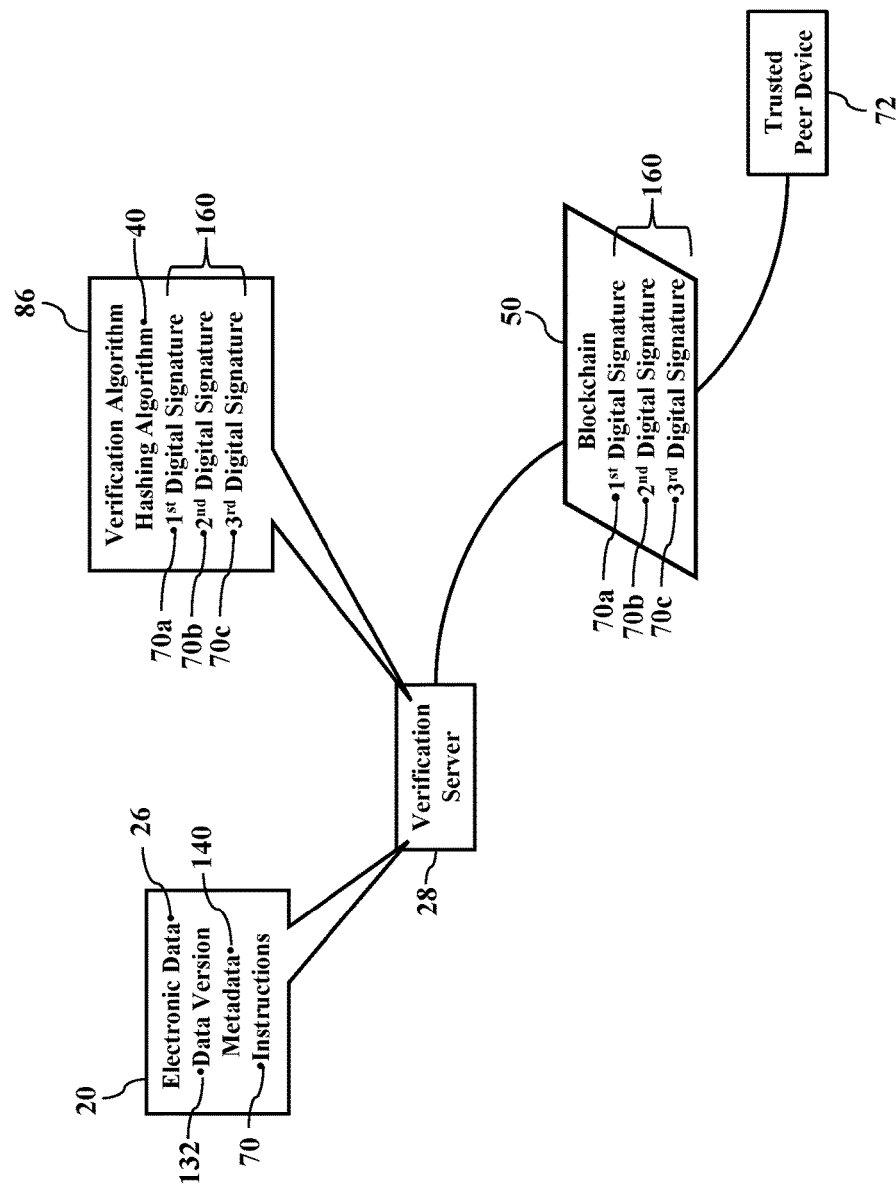
FIG. 14 illustrates a blockchain, according to exemplary embodiments.

FIG. 14 further illustrates the blockchain 50, according to exemplary embodiments. Once any of the multiple digital signatures 160 is/are generated, exemplary embodiments may incorporate one or more of the multiple digital signatures 160 into the blockchain 50. That is, any one or more of the multiple digital signatures 160 may be added to, stored in, or incorporated into any record, transaction, or block within the blockchain 50. FIG. 14, for simplicity, illustrates the blockchain 50 including the first digital signature 70a (based on the data version 132), the second digital signature 70b (based on the metadata 140), and the third digital signature 70c (based on the instructions 150). The verification server 28 may then distribute or broadcast the blockchain 50 to the trusted peer device 72 for subsequent verification.

Figure 15:
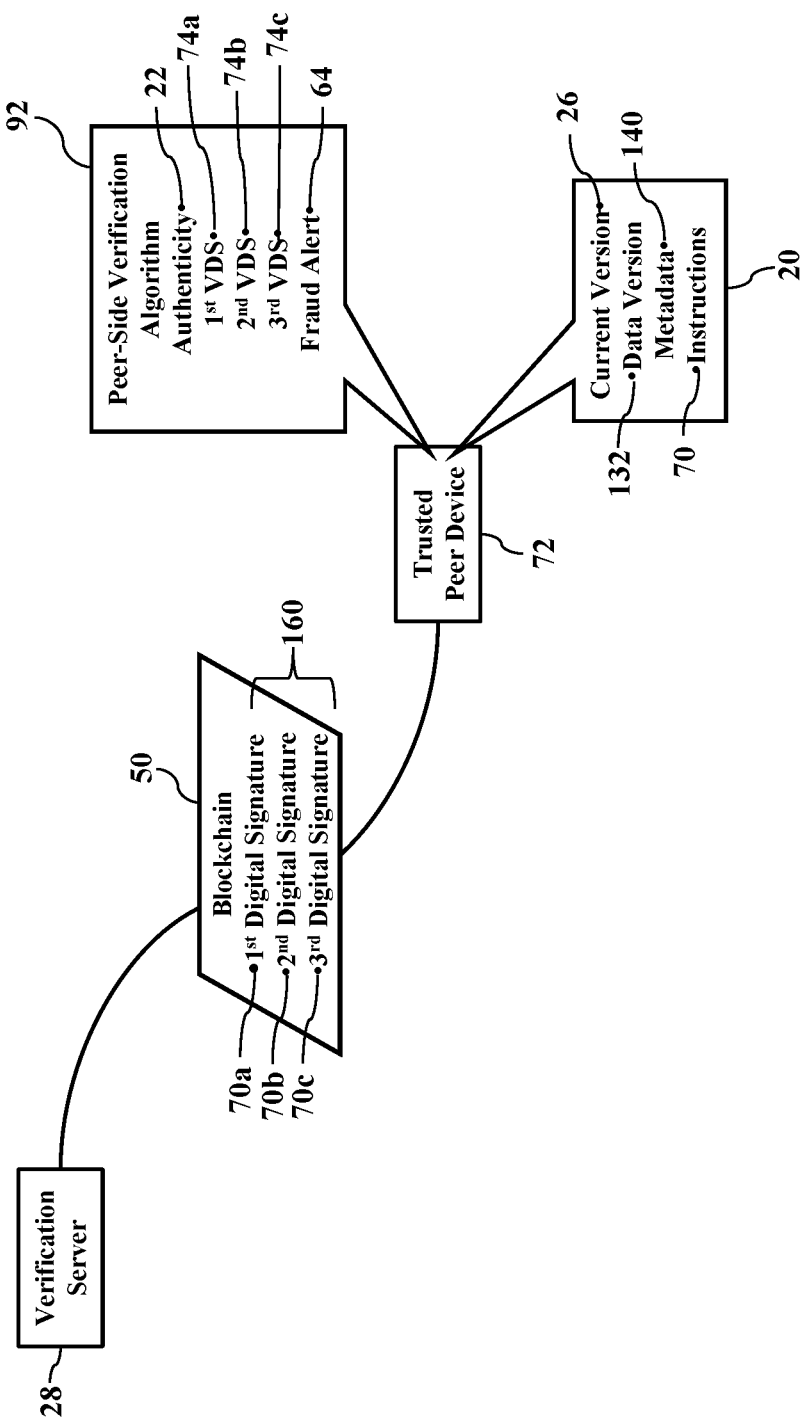
FIG. 15 illustrates multiple verifications, according to exemplary embodiments.

FIG. 15 illustrates multiple verifications, according to exemplary embodiments. Once any of the multiple digital signatures 160 (e.g., 70a, 70b, and/or 70c) are received (perhaps via the blockchain 50), the trusted peer device 72 may then use any one or more of the multiple digital signatures 160 to verify the authenticity 22 of the current version 60 of the electronic document 20. The peer-side verification algorithm 92, for example, may cause the trusted peer device 72 to generate a first verification digital signature ("1$^{st}$ VDS") 74a by hashing the data version 132 associated with the current version 60. The peer-side verification algorithm 92 additionally or alternatively cause the trusted peer device 72 to generate a second verification digital signature ("2$^{nd}$ VD") 74b by hashing the metadata 140 associated with the current version 60. The peer-side verification algorithm 92 additionally or alternatively cause the trusted peer device 72 to generate a third verification digital signature ("3$^{rd}$ VDS") 74b by hashing the metadata 140 associated with the current version 60. If any one or more of the verification digital signatures 74a, 74b, and/or 74c satisfactorily compares to their corresponding digital signatures 70a, 70b, and/or 70c, then the peer-side verification algorithm 92 may infer or determine that the current version 60 is authentic and unaltered. However, if any one or more of the verification digital signatures 74a, 74b, and/or 74c fails to satisfy their corresponding digital signatures 70a, 70b, and/or 70c, then the peer-side verification algorithm 92 may infer that the current version 60 is inauthentic and altered. The peer-side verification algorithm 92 may thus generate the fraud alert 64 to implement enhanced security measures.

Figure 16:
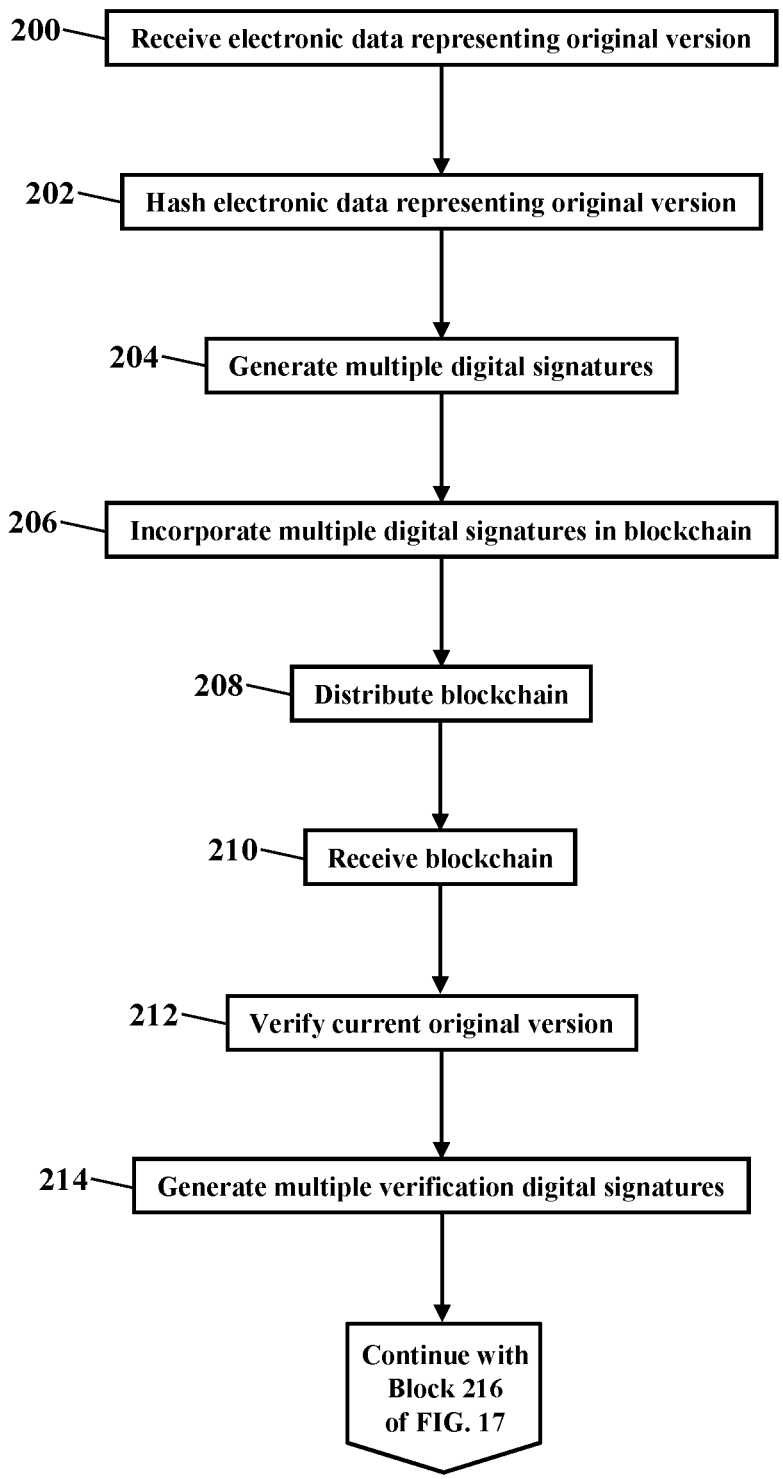
FIGS. 16-17 are flowcharts illustrating a method of authentication, according to exemplary embodiments.
Figure 17:
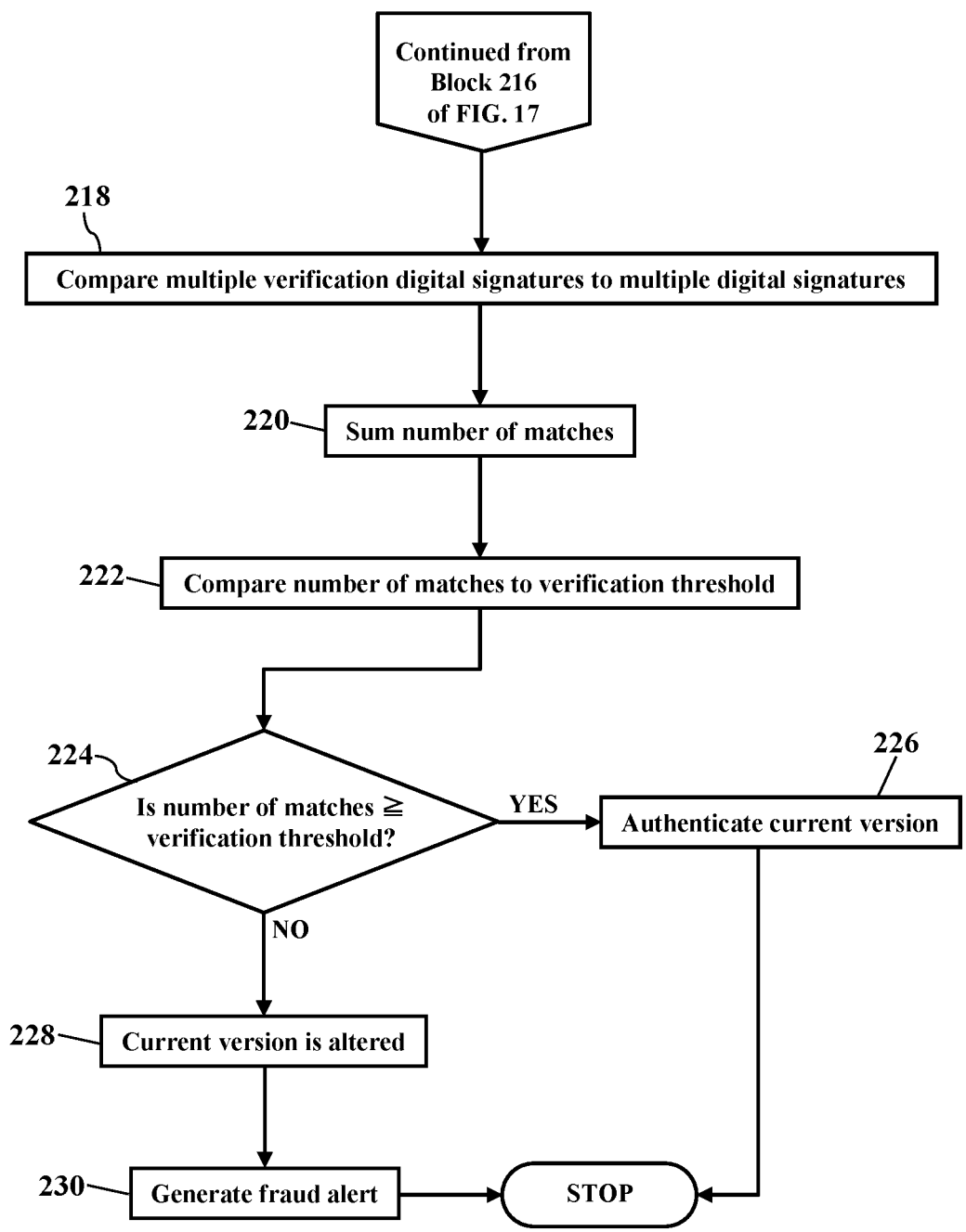

FIGS. 16-17 are flowcharts illustrating a method of authentication, according to exemplary embodiments. The electronic data 26 representing the original version 32 of the electronic document 20 is retrieved (Block 200) and hashed using the hashing algorithm 40 (Block 202). One or more of the multiple digital signatures 160 are generated (Block 204) and incorporated into the blockchain 50 (Block 206). The blockchain 50 is distributed via the Internet (Block 208). When the blockchain 50 is received (by any recipient, such as the trusted peer device 72) (Block 210), any of the multiple digital signatures 160 may be used verify the current version 60 of the electronic document 20 (Block 212). The multiple verification digital signatures 74a, 74b, and/or 74c are generated based on the current version 60 of the electronic document 20 (Block 214).

The flowchart continues with FIG. 17. The multiple verification digital signatures 74a, 74b, and/or 74c are compared to the multiple digital signatures 160 incorporated into the blockchain 50 (Block 218). The number of matches is summed (Block 220) and compared to a verification threshold (Block 222). If the number of matches equals or exceeds the verification threshold (Block 224), then the current version 60 is authentic (Block 226). However, if the number of matches is less than the verification threshold (Block 224), then the current version 60 is altered (Block 228) and fraud alert 64 is generated (Block 230).

Figure 18:
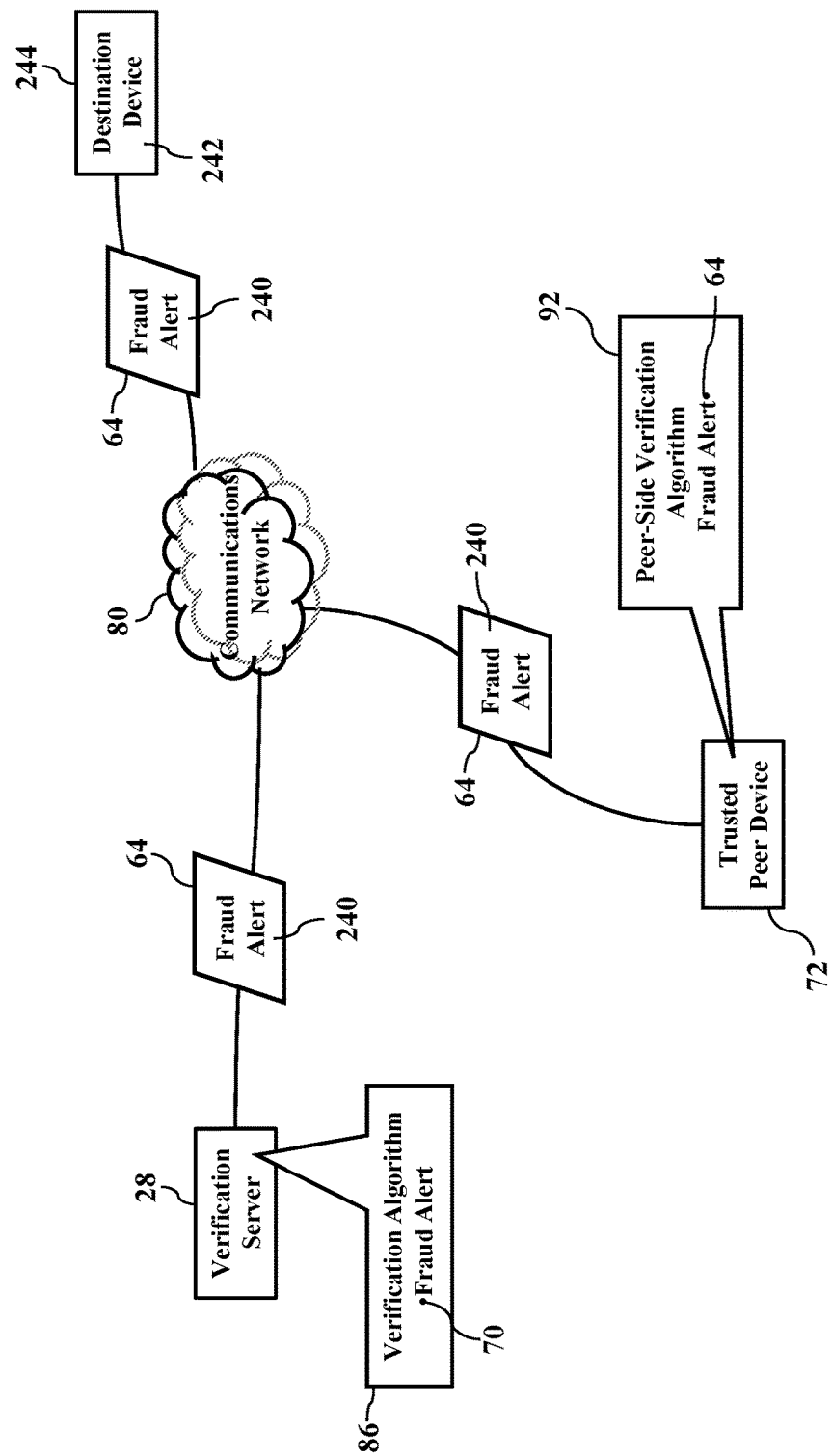
FIG. 18 illustrates a fraud alert, according to exemplary embodiments.

FIG. 18 illustrates the fraud alert 64, according to exemplary embodiments. The verification server 28 and/or the trusted peer device 72 generates the fraud alert 64. While the fraud alert 64 may have any mechanism and structure, FIG. 17 illustrates a simple notification example. The fraud alert 64 is an electronic message 240 that is sent to one or more notification addresses 242. The electronic message 240 routes via the communications network 80 to a network address (e.g., IP address) associated with a destination device 244. The electronic message 240 contains information or data describing an inauthenticity of the current version 60 of the electronic document 20, based on one or more of the non-matching digital signatures 70.

Figure 19:
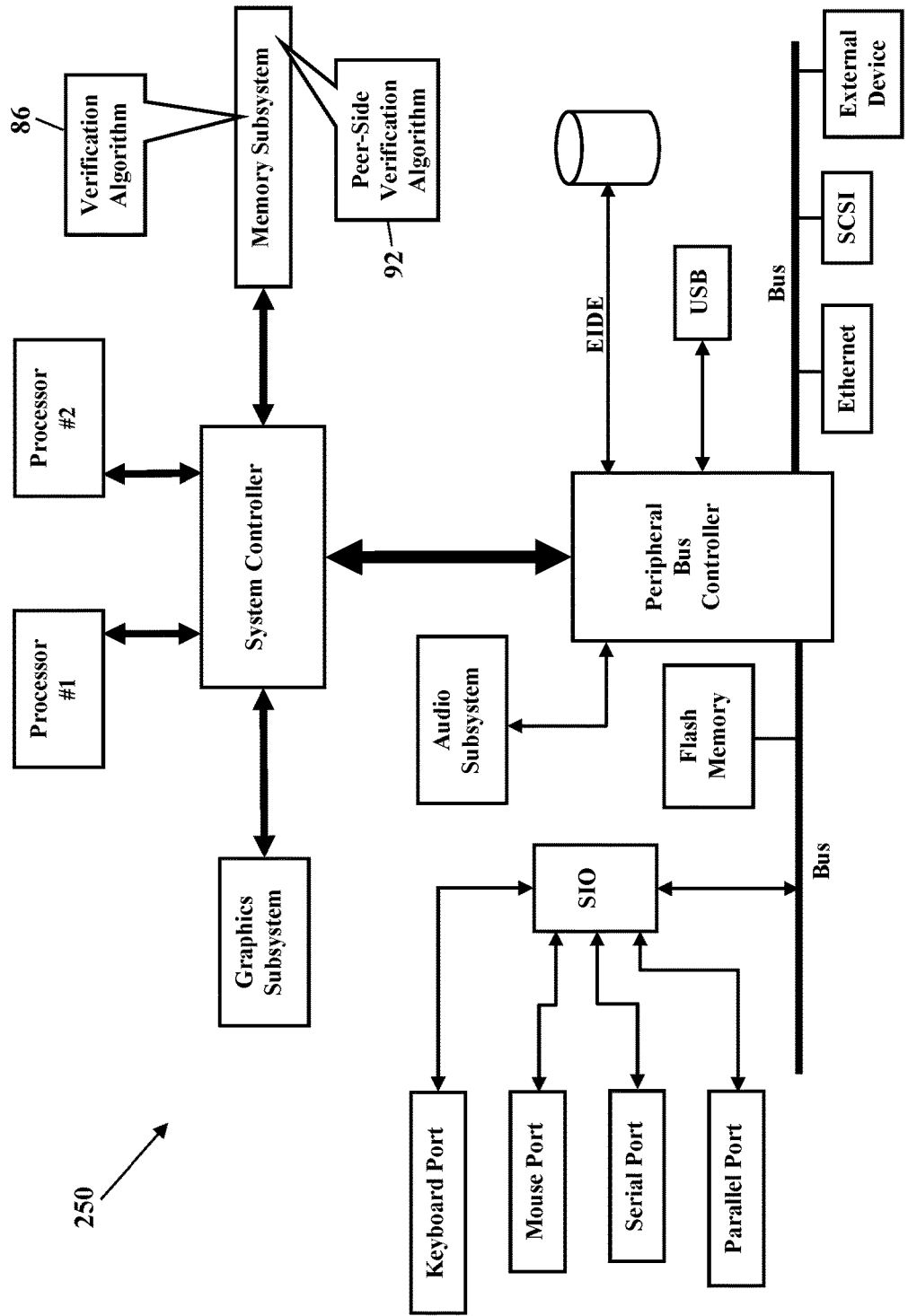
FIGS. 19-20 depict still more operating environments for additional aspects of the exemplary embodiments.

FIG. 19 is a schematic illustrating still more exemplary embodiments. FIG. 19 is a more detailed diagram illustrating a processor-controlled device 250. As earlier paragraphs explained, the verification algorithm 86 and the peer-side verification algorithm 92 may partially or entirely operate in any mobile or stationary processor-controlled device. FIG. 19, then, illustrates the verification algorithm 86 and the peer-side verification algorithm 92 stored in a memory subsystem of the processor-controlled device 250. One or more processors communicate with the memory subsystem and execute either, some, or all applications. Because the processor-controlled device 250 is well known to those of ordinary skill in the art, no further explanation is needed.

Figure 20:
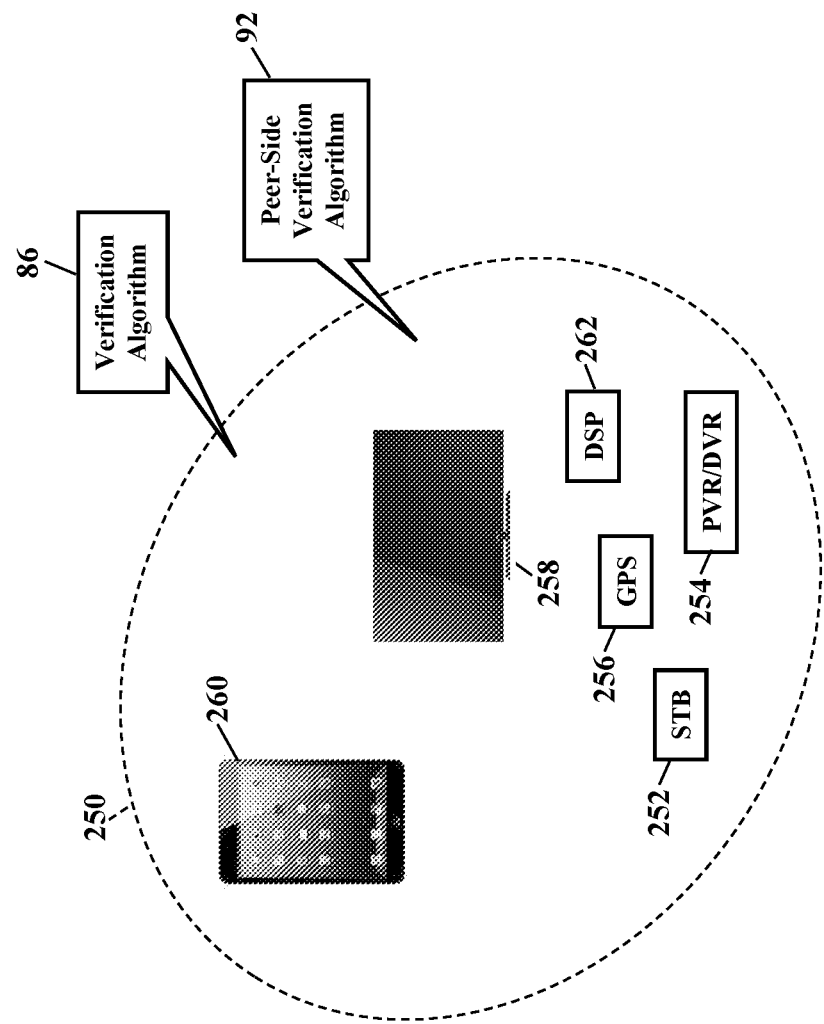

FIG. 20 depicts other possible operating environments for additional aspects of the exemplary embodiments. FIG. 20 illustrates the verification algorithm 86 and the peer-side verification algorithm 92 operating within various other processor-controlled devices 250. FIG. 20, for example, illustrates that the verification algorithm 86 and the peer-side verification algorithm 92 may entirely or partially operate within a set-top box ("STB") (252), a personal/digital video recorder (PVR/DVR) 254, a Global Positioning System (GPS) device 256, an interactive television 258, a tablet computer 260, or any computer system, communications device, or processor-controlled device utilizing any of the processors above described and/or a digital signal processor (DP/DSP) 262. Moreover, the processor-controlled device 250 may also include wearable devices (such as watches), radios, vehicle electronics, clocks, printers, gateways, mobile/implantable medical devices, and other apparatuses and systems. Because the architecture and operating principles of the various devices 250 are well known, the hardware and software componentry of the various devices 250 are not further shown and described.

Exemplary embodiments may be applied to any signaling standard. Most readers are thought familiar with the Global System for Mobile (GSM) communications signaling standard. Those of ordinary skill in the art, however, also recognize that exemplary embodiments are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard. Exemplary embodiments may also be applied to other standards, such as the I.E.E.E. 802 family of standards, the Industrial, Scientific, and Medical band of the electromagnetic spectrum, BLUETOOTH®, and any other.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for verifying authenticity of electronic documents, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method of verifying an authenticity of an electronic document, the method comprising:
retrieving, by a hardware processor, a metadata representing the electronic document, the metadata formatted according to a format;
generating, by the hardware processor, a digital signature representing only the metadata in response to hashing only the metadata using an electronic representation of a hash function;
incorporating, by the hardware processor, the digital signature representing only the metadata in a blockchain;
distributing, by the hardware processor, the blockchain incorporating the digital signature representing only the metadata via the Internet to a peer device;
generating, by the hardware processor, a hash value representing a current version of the electronic document using the electronic representation of the hash function; and
comparing, by the hardware processor, the hash value representing the current version of the electronic document to the digital signature representing only the metadata to determine an authenticity of the current version of the electronic document data.

2. The method of claim 1, further comprising generating the digital signature in response to the hashing of the metadata formatted according to a schema.

3. The method of claim 1, further comprising receiving a data version as the metadata and generating the digital signature in response to the hashing of the data version.

4. The method of claim 1, further comprising receiving a file hierarchy as the metadata and generating the digital signature in response to the hashing of the file hierarchy.

5. The method of claim 1, further comprising receiving global positioning system information as the metadata and generating the digital signature in response to the hashing of the global positioning system information.

6. The method of claim 1, further comprising receiving a character count as the metadata and generating the digital signature in response to the hashing of the character count.

7. The method of claim 1, further comprising receiving a word count as the metadata and generating the digital signature in response to the hashing of the word count.

8. A system, comprising:
a hardware processor; and
a memory device, the memory device storing instructions, the instructions when executed causing the hardware processor to perform operations, the operations comprising:
retrieving a metadata associated with an original version of an electronic document;
generating a digital signature representing only the metadata in response to hashing only the metadata using an electronic representation of a hash function;
incorporating the digital signature representing only the metadata in a blockchain;
distributing the blockchain incorporating the digital signature representing only the metadata via the Internet to a peer device;
retrieving the metadata associated with a current version of the electronic document;
generating a hash value representing only the metadata associated with the current version of the electronic document using the electronic representation of the hash function; and
comparing the hash value representing only the metadata associated with the current version of the electronic document to the digital signature representing only the metadata associated with the original version of the electronic document to determine an authenticity of the current version of the electronic document data.

9. The system of claim 8, wherein the operations further comprise retrieving a date of creation as the metadata representing the electronic document.

10. The system of claim 9, wherein the operations further comprise generating the digital signature in response to the hashing of the date of creation.

11. The system of claim 8, wherein the operations further comprise retrieving a title as the metadata representing the electronic document.

12. The system of claim 11, wherein the operations further comprise generating the digital signature in response to the hashing of the title.

13. The system of claim 8, wherein the operations further comprise retrieving an abstract as the metadata representing the electronic document.

14. The system of claim 13, wherein the operations further comprise generating the digital signature in response to the hashing of the abstract.

15. The system of claim 8, wherein the operations further comprise retrieving a keyword as the metadata representing the electronic document.

16. The system of claim 15, wherein the operations further comprise generating the digital signature in response to the hashing of the keyword.

17. A memory device storing instructions that when executed cause a hardware processor to perform operations, the operations comprising:
retrieving an electronic data and a metadata representing an electronic document;
generating multiple digital signatures representing the electronic document, a first digital signature of the multiple digital signatures generated in response to hashing the electronic data using an electronic representation of a hash function, and a second digital signature of the multiple digital signatures representing only the metadata generated in response to separately hashing only the metadata using the electronic representation of the hash function;
incorporating the first digital signature and the second digital signature representing only the metadata in a blockchain;
distributing the blockchain incorporating the first digital signature and the second digital signature representing only the metadata via the Internet to a peer device;
generating hash values representing a current version associated with the electronic document using the electronic representation of the hash function; and
comparing the hash values representing the current version associated with the electronic document to the first digital signature and to the second digital signature to determine an authenticity of the electronic document data.

18. The memory device of claim 17, wherein the operations further comprise generating a third digital signature of the multiple digital signatures in response to separately hashing only executable code contained within the electronic document.

\* \* \* \* \*